(12) United States Patent
Kase et al.

(10) Patent No.: US 6,989,977 B2
(45) Date of Patent: Jan. 24, 2006

(54) DIGITAL DIRECTIONAL RELAY

(75) Inventors: Takahiro Kase, Tachikawa (JP); Hidenari Amo, Fuchu (JP); Yasutaka Sonobe, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 248 days.

(21) Appl. No.: 10/351,480

(22) Filed: Jan. 27, 2003

(65) Prior Publication Data
US 2003/0142451 A1 Jul. 31, 2003

(30) Foreign Application Priority Data
Jan. 28, 2002 (JP) .............................. 2002-017848

(51) Int. Cl.
*H02H 3/18* (2006.01)
(52) U.S. Cl. ...................................................... 361/80
(58) Field of Classification Search ................. 361/80, 361/81, 82, 84; 307/127
See application file for complete search history.

(56) References Cited

U.S. PATENT DOCUMENTS

| 4,450,497 | A | * | 5/1984 | Bignell | 361/85 |
| 4,774,621 | A | * | 9/1988 | Andow | 361/80 |
| 4,896,241 | A | * | 1/1990 | Li et al. | 361/66 |
| 5,365,396 | A | | 11/1994 | Roberts et al. | |
| 5,796,630 | A | * | 8/1998 | Maeda et al. | 361/160 |
| 5,956,220 | A | * | 9/1999 | Novosel et al. | 361/62 |
| 6,584,417 | B1 | * | 6/2003 | Hu et al. | 702/58 |

FOREIGN PATENT DOCUMENTS

| DE | 199 01 789 | 7/2000 |
| EP | 0 769 0836 | 4/1997 |
| KR | 1994-0020648 | 9/1994 |
| KR | 2000-0051513 | 8/2000 |

OTHER PUBLICATIONS

Electric Technology Research Association, vol. 37-1.
Janez Zakonjsek, et al., "Oscillations of Mechanical Masses in Power Systems and Their Impact on Operation of the (Distance) Protection Devices", China T&D Conference, 1999.
K. S. Prakash, et al., IEEE Transactions on Power Delivery, vol. 5, No. 4, pp. 1687-1694, XP-000171125, "Laboratory Investigation of an Amplitude Comparator Based Directional Comparision Digital Protection Scheme", Nov. 1990.
P. G. McLaren, et al., IEEE Transactions on Power Delivery, vol. 10, No. 2, pp. 666-675, XP-000539093, "A New Dirctional Element for Numerical Distance Relays", Apr. 1995.
A. Otto, et al., ABB Review, No. 1, pp. 19-26, XP-000101467, "Detecting High-Resistance Earth Faults", 1990.

* cited by examiner

Primary Examiner—Stephen W. Jackson
Assistant Examiner—Boris Benenson
(74) Attorney, Agent, or Firm—Oblon, Spivak, McClelland, Maier & Neustadt, P.C.

(57) ABSTRACT

A digital directional relay converts a voltage value and a current value of a power system into digital voltage data and digital current data by periodic sampling and determines a direction of a fault using the digital voltage data and the digital current data. In the digital directional relay, a variation in unbalanced component voltage and a variation in unbalanced component current are computed using both voltage data at a reference point in time and voltage data at a point in time elapsed from the reference point in time by a given sampling interval and using both current data at reference time and current data at time elapsed from the reference time by a given sampling interval, respectively. A relationship in phase between these variations is obtained to determine whether a forward fault or a reverse fault occurs.

5 Claims, 6 Drawing Sheets

DIGITAL DIRECTIONAL RELAY

BACKGROUND OF THE INVENTION

1. Field of the Invention

The present invention relates to a digital directional relay that determines a direction of a fault using a variation in amount of electricity of unbalanced components such as a variation in negative-phase-sequence components and a variation in zero-phase-sequence components.

2. Description of the Related Art

Directional relays for determining the direction of a fault occurring in a power system using an amount of electricity of negative-phase-sequence components or that of electricity of zero-phase-sequence components are widely known by, for example, Electric Technology Research Association Report, Volume 37-1, pages 54–55.

Assume that the sample values of voltage and current of the power system, which are obtained at regular sampling intervals, are Vm and Im, respectively in order to implement a digital negative-phase-sequence directional relay. The negative-phase-sequence components of the voltage and current are computed by the following equations (1) and (2):

$$3V_{2m} = V_{am} + V_{b(m-8)} + V_{c(m-4)} \quad (1)$$

$$3I_{2m} = I_{am} + I_{b(m-8)} + I_{c(m-4)} \quad (2)$$

wherein m is a sampling point in time, subscript 2 is a negative-phase-sequence component, a, b and c are amounts of electricity of A-, B- and C-phases, and m−α is an amount of electricity that is generated α-sampling before m. The sampling interval corresponds to an electrical angle of 30 degrees.

Since there are no negative-phase-sequence components when a power system is kept in three-phase equilibrium, the values of respective terms of the equations (1) and (2) are zero (0). If an unbalanced fault occurs in the power system, the negative-phase-sequence impedance Z2 for a system protection relay satisfies the following equation: $V_{2m} = Z_2 \times I_{2m}$. Since most of the negative-phase-sequence impedance $Z_2$ is generally reactance components, $V_{2m}$ and $I_{2m}$ are out of phase with each other by almost 90 degrees. The matter as to which phase of voltage and current advances depends upon whether the fault occurs in a forward (protecting) direction or a reverse direction.

Figure 18:
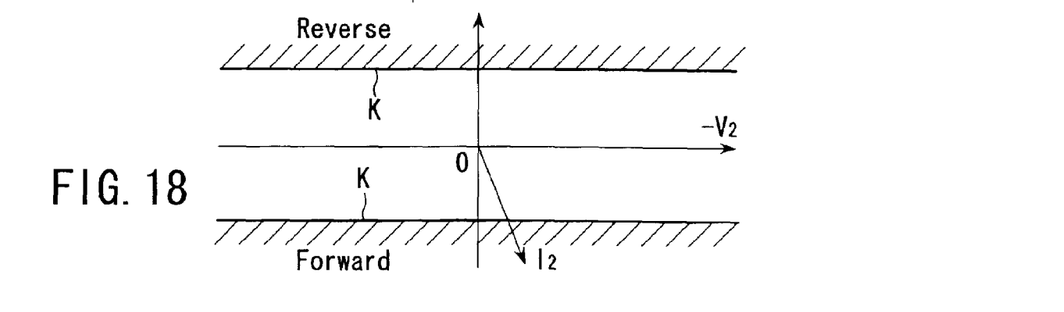
FIG. 18 is a diagram showing a determination operating range obtained by computation of a prior art negative-phase-sequence relay.

Since a negative-phase-sequence circuit has no power supplies, it is in phase opposite to that of a positive-phase-sequence circuit. The phase of current leads that of voltage when a forward fault occurs and the former lags the latter when a reverse fault does. For example, the phase of current advances by 90 degrees to obtain an inner product between current and voltage. If the inner product is positive, it can be determined that a reverse fault has occurred. If it is negative, it can be determined that a forward fault has occurred. The following is the actual determination computing expression:

$$V_{2m} \times J_{2m} + V_{2(m-3)} \times J_{2(m-3)} < 0 \quad (3)$$

where $J_{2m}$ represents a value obtained by advancing the phase of $I_{2m}$ by 90 degrees. The operating range of the negative-phase-sequence directional relay can be shown in FIG. 18 if it actually includes some dead zones K.

The above principle is very true of a zero-phase-sequence circuit in a ground fault. A zero-phase-sequence component is simply used in the amount of electricity to determine the ground fault.

However, when a single electric power pylon carries multiple circuit causing zero-phase-sequence cyclic currents to flow among the wires, or while one of three phases is temporarily disconnected for example during a period of dead time of a single-phase reclosing relay, there are unbalanced components such as negative-phase-sequence components and zero-phase-sequence components though no fault actually occurs in a power system. If an operation for determining a fault is carried out using an amount of electricity of the unbalanced components in this case, there is possibility that the directional relay will decrease in sensitivity or mal-operation.

An object of the present invention is to provide a digital directional relay that is capable of correctly determining a direction of an unbalanced fault even though a power system contains unbalanced components such as negative-phase-sequence components and zero-phase-sequence components in a steady state.

BRIEF SUMMARY OF THE INVENTION

According to an aspect of the present invention, there is provided a digital directional relay which converts a voltage value and a current value of a power system into digital voltage data and digital current data by periodic sampling and determines a direction of a fault using the digital voltage data and the digital current data, the digital directional relay comprising a voltage variation computing unit which computes a variation in unbalanced component voltage using both voltage data at a reference point in time and voltage data at a point in time elapsed from the reference point in time by a given sampling interval, a current variation computing unit which computes a variation in unbalanced component current using both current data at reference time and current data at time elapsed from the reference time by a given sampling interval, and a fault determination unit which determines whether a forward fault or a reverse fault occurs based on a relationship in phase between the variation in unbalanced component voltage computed by the voltage variation computing unit and the variation in unbalanced component current computed by the current variation computing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to the accompanying drawings.

Figure 1:
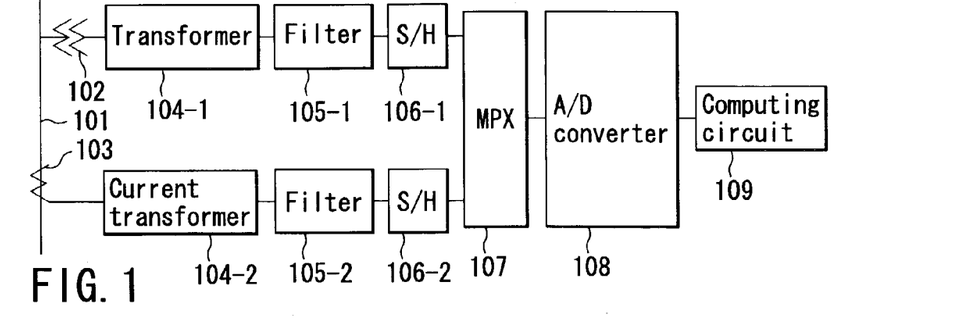
FIG. 1 is a block diagram of hardware common to digital directional relays according to all embodiments of the present invention.

FIG. 1 is a block diagram of hardware common to digital directional relays according to all embodiments of the present invention. In FIG. 1, reference numeral 101 denotes a power transmission line to be protected, numeral 102 indicates a PT circuit for taking a voltage from the power transmission line 101, and numeral 103 shows a CT circuit for taking a current from the power transmission line 101.

Numeral 104-1 denotes a transformer and numeral 104-2 indicates a current transformer, and both of the transformers are input converters. The input converters 104-1 and 104-2 electrically isolate the CT and PT circuits 103 and 102, which are power circuits, from an electronic circuit and convert the current and voltage into digital data that can be processed by a computing circuit 109 (described later).

Numerals 105-1 and 105-2 each represent an analog filter that cuts a turnaround frequency. Numerals 106-1 and 106-2 each indicate a sample holder for sampling an output of the analog filter at regular intervals and holding the sample values.

Numeral 107 denotes a multiplexer for sorting a plurality of sample hold values in time sequence and outputting them. Numeral 108 shows an A/D converter for converting the values output from the multiplexer 107 into digital values. Numeral 109 indicates a digital computing circuit such as a microcomputer.

(First Embodiment)

Figure 2:
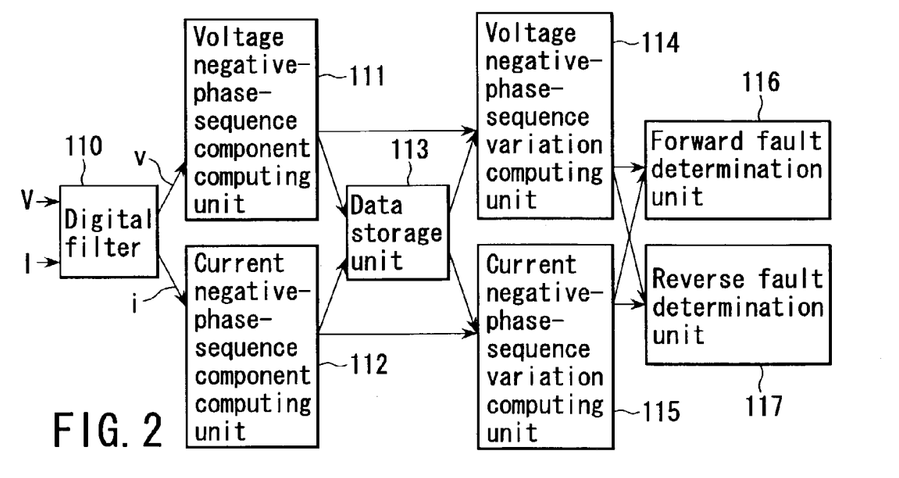
FIG. 2 is a block diagram of a computing circuit of a digital directional relay according to a first embodiment of the present invention.

FIG. 2 is a block diagram of a computing circuit 109 of a digital directional relay according to a first embodiment of the present invention. The functions of the computing circuit 109 are represented as a plurality of computing units. In FIG. 2, reference numeral 110 shows a digital filter. Upon receiving digital data items V and I, the digital filter 110 filters them and supplies the filtered data items v and i to their respective computing units 111 and 112 (described below).

Numeral 111 indicates a voltage negative-phase-sequence component computing unit. The unit 111 computes a negative-phase-sequence component of voltage by, e.g., the following equation (4):

$$3V_{2m} = V_{Am} + V_{B(m-8)} + V_{c(m-4)} \tag{4}$$

where m indicates a sample at this point in time. Assume that data appears every 30 degrees. In the equation (4), therefore, m−4 means 120-degree-old data.

Numeral 112 denotes a current negative-phase-sequence component computing unit. The unit 112 computes a current negative-phase-sequence component by, e.g., the following equation (5)

$$3I_{2m} = I_{Am} + I_{B(m-8)} + I_{c(m-4)} \tag{5}$$

Numeral 113 represents a data storage unit. The unit 113 stores voltage data and current data as results obtained by the voltage negative-phase-sequence component computing unit 111 and current negative-phase-sequence component computing unit 112.

Numeral 114 indicates a voltage negative-phase-sequence variation computing unit. The unit 114 computes a variation in unbalanced component between a one-cycle-old negative-phase-sequence voltage and a negative-phase-sequence voltage at this point in time by the following equation (6):

$$\Delta V_{2m} = V_{2m} - V_{2(m-12)} \tag{6}$$

Numeral 115 indicates a current negative-phase-sequence variation computing unit. The unit 115 computes a variation in unbalanced component between a one-cycle-old negative-phase-sequence current and a negative-phase-sequence current at this point in time by the following equation (7):

$$\Delta I_{2m} = I_{2m} - I_{2(m-12)} \tag{7}$$

In the first embodiment, first the negative-phase-sequence component is determined and then the negative-phase-sequence variation is done. If this order is reversed, the same results are obtained.

Numeral 116 indicates a forward fault determination unit. The unit 116 determines a forward fault by the relationship in phase between a negative-phase-sequence variation in voltage and a negative-phase-sequence variation in current. Taking into consideration that a negative-phase-sequence impedance is almost reverse reactance, $\Delta I_{2m}$ lags about 90 degrees behind $-\Delta V_{2m}$ when a forward fault occurs. If, therefore, $\Delta I_{2m}$ is shifted in phase by 90 degrees to obtain an inner product between $\Delta I_{2m}$ and $-\Delta V_{2m}$, a relationship in phase between a negative-phase-sequence variation in voltage and a negative-phase-sequence variation in current can be determined. This relationship is given by the following expression (8):

$$\Delta I_{2m \angle 90°} * (-\Delta V_{2m}) \geq k1 |\Delta V_{2m}| \quad (8)$$

Figure 3:
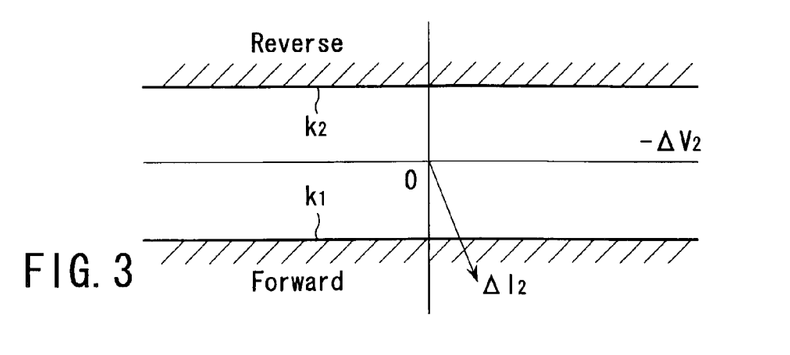
FIG. 3 is a diagram showing a determination operating range of the digital directional relay according to the first embodiment of the present invention.

According to the above expression (8), the determination unit 116 performs a determination operation when a component obtained by multiplying $-\Delta V_{2m}$ by the 90° lead of $\Delta I_{2m}$ becomes equal to or more than $k_1$. FIG. 3 shows a range of the determination operation. The inner product $[\Delta I_{2m \angle 90°} * (-\Delta V_{2m})]$ is computed by the following equation (9):

$$-\Delta V_{2m} * \Delta I_{2m \angle} 90° \quad (9)$$
$$= -\Delta V_{2m} \cdot \Delta J_{2m} - \Delta V_{2(m-3)} \cdot \Delta J_{2(m-3)}$$

where $\Delta J_{2m}$ is a value obtained by advancing the phase of $\Delta I_{2m}$ by 90 degrees. The value is given by, e.g., the following equation (10):

$$\Delta J_{2m} = (\Delta I_{2m} - 2\Delta I_{2(m-2)})/\sqrt{3} \quad (10)$$

The absolute value $|\Delta V_{2m}|$ is given by, e.g., the following equation (11):

$$|\Delta V_{2m}| = \sqrt{(\Delta V_{2m})^2 + (\Delta V_{2(m-3)})^2} \quad (11)$$

When the negative-phase-sequence impedance includes a number of resistance components R, a user has only to change the phase of current to an angle corresponding to the highest sensitivity of determination. The user can set the angle by himself or herself.

Numeral 117 denotes a reverse fault determination unit. Like the unit 116, the unit 117 determines a reverse fault by the relationship in phase between a negative-phase-sequence variation in voltage and a negative-phase-sequence variation in current. Since, however, a reverse fault occurs in a direction opposite to that of a forward fault, it is determined by the following expression (12):

$$\Delta I_{2m \angle 90°} * (-\Delta V_{2m}) < k_2 |\Delta V_{2m}| \quad (12)$$

Since the computation method of determining a reverse fault is identical with that of doing a forward fault, its specific descriptions are omitted.

FIG. 3 shows an operating range for determining a fault. In the above expressions (8) and (12), $k_1$ and $k_2$ indicate elements for determining sensitivity of determination and depend upon the conditions of a power system.

The digital directional relay according to the foregoing embodiment is unsusceptible to an amount of electricity of negative-phase-sequence components that exist at all times since it uses a variation in amount of electricity of unbalanced components such as a negative-phase-sequence variation in voltage and a negative-phase-sequence variation in current. Further, the digital directional relay can increase the precision with which the direction of a fault is determined.

The above is very true of the case where a fault is determined by shifting a phase of voltage instead of doing a phase of current, though it is obvious. In order to determine a relationship in phase between a negative-phase-sequence variation in voltage and a negative-phase-sequence variation in current, an inner product is computed by shifting an amount of electricity of either one of them by 90 degrees. However, an outer product can be computed to do so.

(First Modification)

As a first modification to the first embodiment, there is a method of simply determining a fault only by a difference in phase.

As has been described above, the phases of $-\Delta V_{2m}$ and $\Delta J_{2m}$ are substantially the same in a forward fault. The forward fault can thus be determined by the following equation (13) if a phase difference between them is $\phi$:

$$-\Delta V_{2m} * \Delta J_{2m} = |-\Delta V_{2m}||\Delta J_{2m}| \cos\phi \geq |-\Delta V_{2m}||\Delta J_{2m}| X \quad (13)$$

If X=0, a determination operating range is given by the following expression:

$$-\frac{\pi}{2} \leq \phi \leq \frac{\pi}{2}$$

Assuming that $$X = \frac{\sqrt{2}}{2},$$

the following expression is obtained:

$$-\frac{\pi}{4} \leq \phi \leq \frac{\pi}{4}$$

Figure 4:
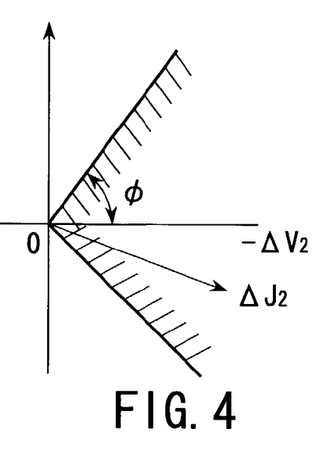
FIG. 4 is a diagram showing a determination operating range of a first modification to the digital directional relay according to the first embodiment of the present invention.

This determination operating range is shown in FIG. 4.

(Second Modification)

Figure 5:
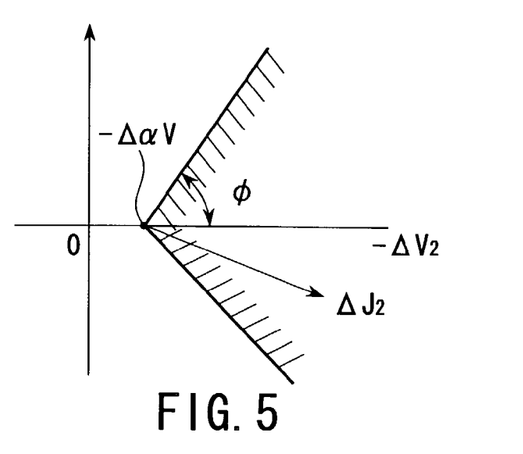
FIG. 5 is a diagram showing a determination operating range of a second modification to the digital directional relay according to the first embodiment of the present invention.

As a second modification to the first embodiment, an operating range for determining a fault is offset. Substituting $-(\Delta V_{2m} - \alpha \times \Delta V_{2m})$ into $-\Delta V_{2m}$ of the determination operating range shown in FIG. 4, the operating range is offset by $\alpha \times \Delta V_{2m}$ as shown in FIG. 5. For example, $\alpha$ is a constant.

The determination operating range is offset in the direction of voltage. However, it can be done in the direction of current if the oscillation of a system is computed with respect to the current.

As described above, various simple modifications or functions can be added to the digital directional relay according to the first embodiment. The second modification is similar to the first embodiment and the first modification in that a fault is determined on the basis of a difference in phase between a variation in negative-phase-sequence current and that in negative-phase-sequence voltage.

(Second Embodiment)

Figure 6:
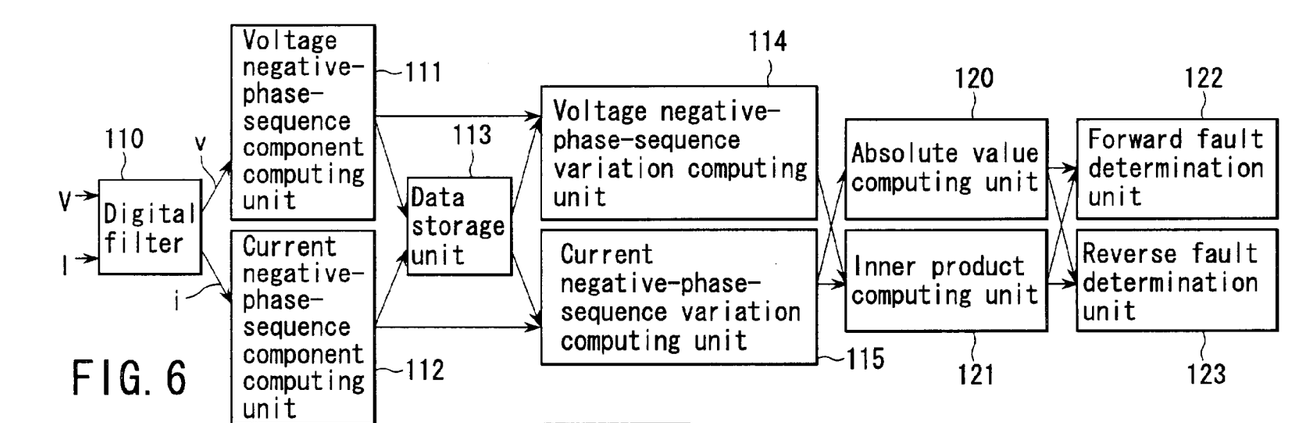
FIG. 6 is a block diagram of a computing circuit of a digital directional relay according to a second embodiment of the present invention.

FIG. 6 is a block diagram of a computing circuit 109 of a digital directional relay according to a second embodiment of the present invention. The computing circuit 109 includes a plurality of computing units.

The digital directional relay according to the second embodiment computes a negative-phase-sequence unbalanced impedance from both negative-phase-sequence variations in current and voltage and determines a direction of a fault based on the computed impedance. The digital filter 110 and the computing units 111 to 115 are the same as those of the first embodiment shown in FIG. 2 and thus their descriptions are omitted.

Reactance of the negative-phase-sequence unbalanced impedance can be obtained by $I_m(\Delta V_2/\Delta I_2)$. The negative-phase-sequence unbalanced components, which exist in a steady state in a power system, can be cancelled by the use of the negative-phase-sequence unbalanced impedance obtained from the negative-phase-sequence variations in current and voltage, thereby increasing in precision of determination.

A negative-phase-sequence circuit has no power supplies in a steady state. The voltage generated when a forward fault occurs depends upon a rear impedance, and the phase of current leads that of voltage. In the forward fault, the degree of the lead of the phase of the current over that of the voltage is not relevant to a fault point but equals to the rear impedance.

The voltage generated when a reverse fault occurs depends upon a front impedance, the phase of current lags that of voltage. If the phase of current lags in a positive direction, the forward power system is the largest and its impedance is minimized in the reverse fault. If, therefore, the impedance of the largest forward power system is not higher than the minimum value or may be negative, it can be determined that a forward fault occurs. The determination is given by the following expression (14):

$$I_m(\Delta V_2/\Delta I_2) < K_1 \tag{14}$$

where $K_1$ has only to be not higher than the minimum impedance that is considerable in view of a configuration of a power system or the like.

Rewriting the above expression (14) in a product form, the following expression (15) is derived. If the expression (15) is satisfied, a fault is determined as a forward one. If not, a fault is determined as a reverse one.

$$\Delta V_2 * \Delta I_2 \angle 90° < K_1 \Delta I_2^2 \tag{15}$$

In order to resolve the above expression (15), the extent of the negative-phase-sequence variation in current and the inner product of the negative-phase-sequence variations in voltage and current have only to be determined.

In FIG. 6, reference numeral 120 denotes an absolute value computing unit. The unit 120 computes the square of the amount of negative-phase-sequence variation in current. This computation is performed by the following equation (16):

$$|\Delta I_2|^2 = (\Delta I_{2m})^2 + (\Delta I_{2(m-3)})^2 \tag{16}$$

Numeral 121 indicates an inner product computing unit. The unit 121 computes an inner product of the variation obtained by shifting the phase of a negative-phase-sequence variation in current by 90 degrees and the negative-phase-sequence variation in voltage. This inner product is computed by the equation (9) described above.

Numeral 122 denotes a forward fault determination unit. The unit 122 determines a forward fault when the above expression (15) is satisfied with the results of the absolute value computing unit 120 and inner product computing unit 121. Numeral 123 shows a reverse fault determination unit. The unit 123 determines a reverse fault when the above expression (15) is unsatisfied with the results of the units 120 and 121.

Figure 7:
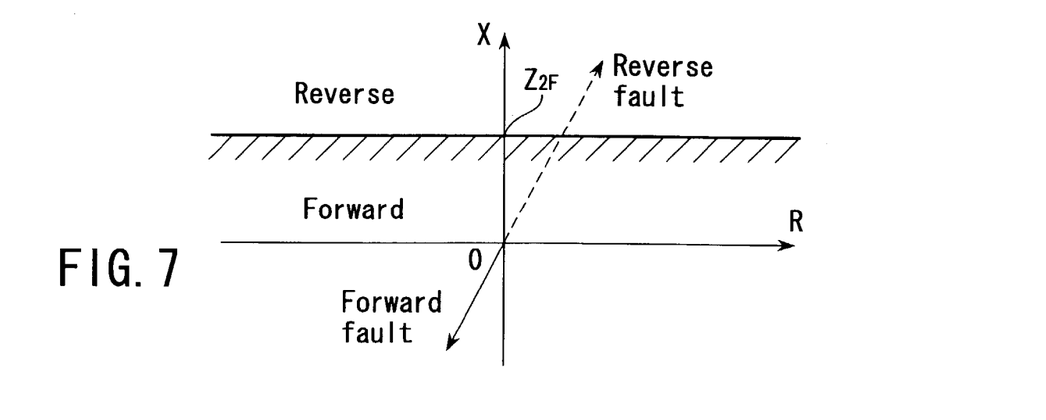
FIG. 7 is a diagram showing a determination operating range of the digital directional relay according to the second embodiment of the present invention.

As described above, the digital directional relay according to the second embodiment is unsusceptible to an amount of electricity of negative-phase-sequence components that exist at all times by determining a negative-phase-sequence impedance using a variation in amount of electricity of unbalanced components such as a negative-phase-sequence variation in voltage and a negative-phase-sequence variation in current. Further, the digital directional relay can increase the precision with which the direction of a fault is determined. An example of a determination operating range in this case is shown in FIG. 7.

When an error is likely to occur due to the conditions of a power system, a dead zone can be included in the determination operating range. The following expression (17) is a modification to that of the second embodiment:

$$K_1 \Delta I_2^2 - \Delta V_2 * \Delta I_2 \angle 90° > K_2 \tag{17}$$

In the above expression (17), not zero but the constant is set on the right side; therefore, the sensitivity of determination can be adjusted to reduce the error. Since the other computations in the second embodiment are identical with those in the first embodiment, their descriptions are omitted.

(Third Embodiment)

Figure 8:
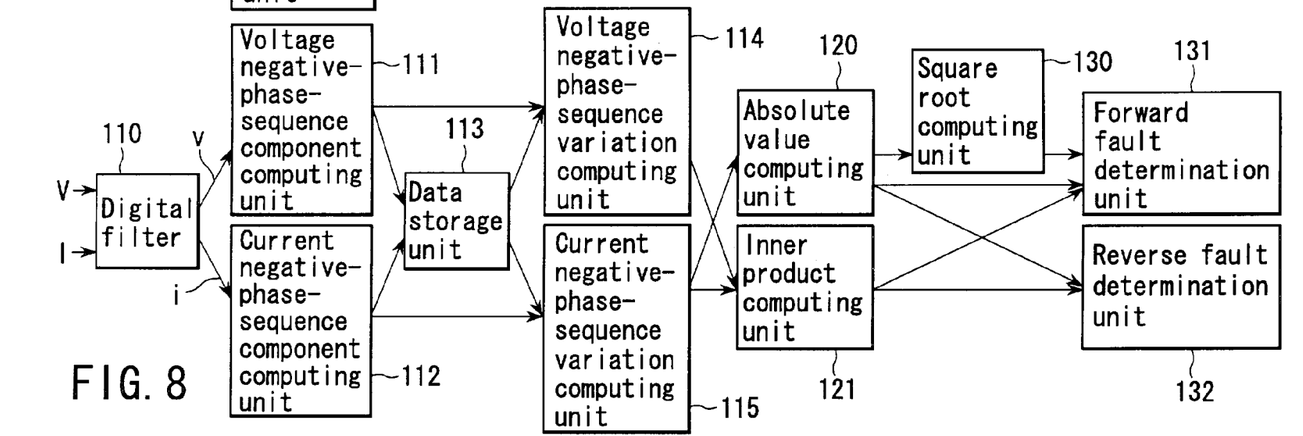
FIG. 8 is a block diagram of a computing circuit of a digital directional relay according to a third embodiment of the present invention.

FIG. 8 is a block diagram of a computing circuit 109 of a digital directional relay according to a third embodiment of the present invention. The computing circuit 109 includes a plurality of computing units.

In the third embodiment, the digital filter 110 and the computing units 111 to 115 are the same as those of the first embodiment shown in FIG. 2. Further, the absolute value computing unit 120 and inner product computing unit 121 are the same as those of the second embodiment shown in FIG. 6. Accordingly, their descriptions are omitted.

A forward fault determination unit 131 determines a forward fault when a determination expression (19), described later, is satisfied with the results of the absolute value computing unit 120 and inner product computing unit 121. A reverse fault determination unit 132 determines a reverse fault when the determination expression (19) is unsatisfied with the results of the units 120 and 121.

In the third embodiment, a forward fault is determined by the following expression (18):

$$K_1 \Delta I_2 - \Delta V_2 \cos(\phi - \Psi) \geq K_2 \tag{18}$$

where $\Psi$ has only to be set at an angle corresponding to the highest sensitivity of determination. As described above, most of the impedance of a negative-phase-sequence circuit is generally reactance components, so that a difference in phase between current and voltage is almost 90 degrees. Therefore, $\Psi$ has only to be set at approximately 90 degrees.

The setting of $\Psi$ at 90 degrees will be described hereinafter.

If each side of the expression (18) is multiplied by $\Delta I_2$, the following sampling expression (19) is given:

$$K_1 |\Delta I_{2m}|^2 - \Delta V_{2m} * \Delta I_{2m} \angle 90° \geq K_2 \Delta I_{2m} \tag{19}$$

Reference numeral 130 indicates a square root computing unit. The unit 130 computes a square root of the square of a negative-phase-sequence variation in current.

Figure 9:
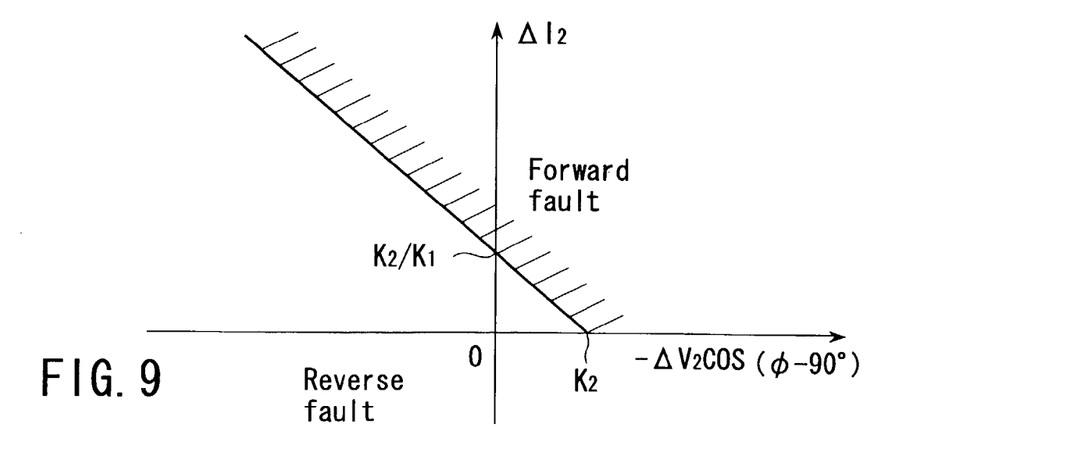
FIG. 9 is a diagram showing a determination operating range of the digital directional relay according to the third embodiment of the present invention.

The forward fault determination unit 131 and reverse fault determination unit 132 determine their respective forward and reverse faults by the expression (19) based on the results of the respective computing units 120, 121 and 130. The determination operating range corresponding to the expression (19) is shown in FIG. 9.

Figure 10:
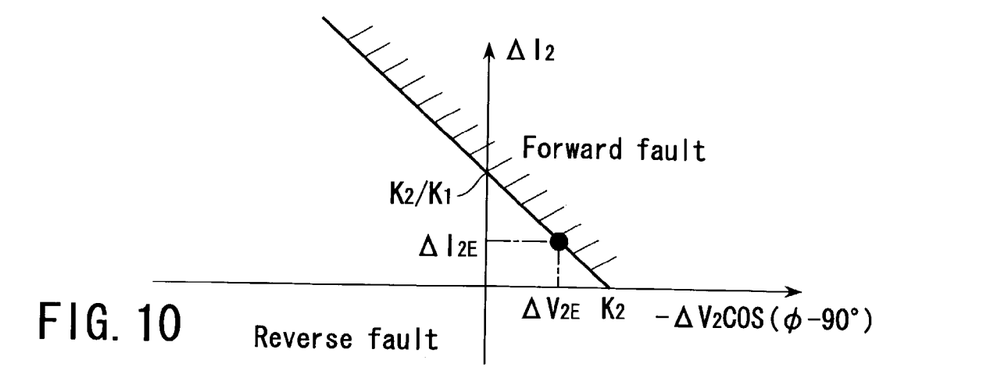
FIG. 10 is a diagram showing an example of setting of the determination operating range of the digital directional relay according to the third embodiment of the present invention.

The digital directional relay according to the third embodiment is unsusceptible to an amount of electricity of negative-phase-sequence components that exist at all times using a variation in amount of electricity of unbalanced components such as a negative-phase-sequence variation in voltage and a negative-phase-sequence variation in current. As is seen from the graph shown in FIG. 9, particularly, the determination method according to the third embodiment has a feature that it can correct an error since determination sensitivity is set for each of $\Delta V_2$ and $\Delta I_2$. If a determination operating range is set as shown in FIG. 10 when the maximum values of errors can be assumed to be $\Delta V_{2E}$ and $\Delta I_{2E}$, a mal-operation due to the errors can be prevented from occurring.

(Fourth Embodiment)

Figure 11:
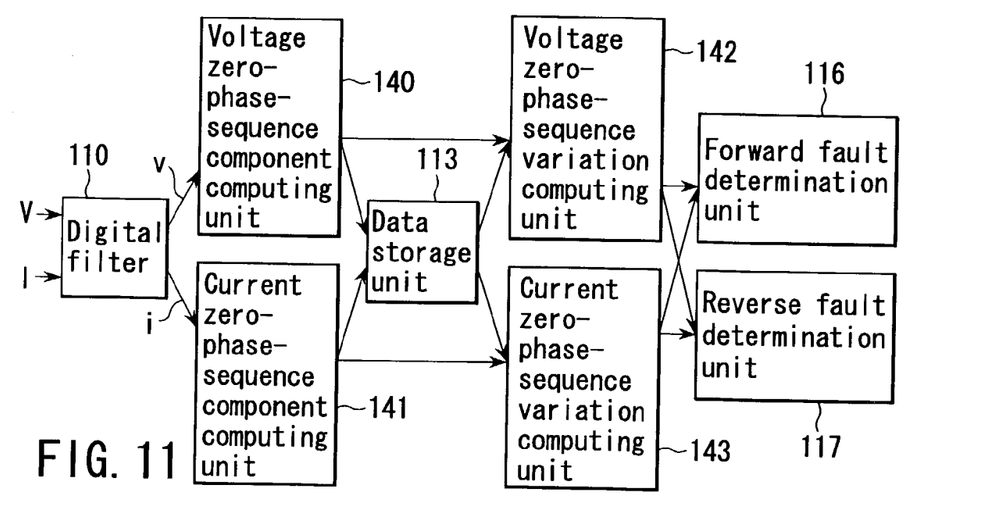
FIG. 11 is a block diagram of a computing circuit of a digital directional relay according to a fourth embodiment of the present invention.

FIG. 11 is a block diagram of respective computing units of a digital directional relay according to a fourth embodiment of the present invention.

The fourth embodiment is identical with the first embodiment shown in FIG. 2 except that an amount of electricity of zero-phase-sequence components is used in place of that of electricity of negative-phase-sequence components.

In FIG. 11, reference numeral 140 denotes a voltage zero-phase-sequence component computing unit and reference numeral 141 indicates a current zero-phase-sequence component computing unit. These units 140 and 141 perform their computations by the following equations (20) and (21):

$$3V_{0m} = V_{am} + V_{bm} + V_{cm} \quad (20)$$

$$3I_{0m} = I_{am} + I_{bm} + I_{cm} \quad (21)$$

Reference numeral 142 indicates a voltage zero-phase-sequence variation computing unit and reference numeral 143 shows a current zero-phase-sequence variation computing unit. These units 142 and 143 compute a variation from a one-cycle-old unbalanced component voltage to an unbalanced component voltage at this point in time and a variation from a one-cycle-old unbalanced component current to an unbalanced component current at this point in time by the following equations (22) and (23), respectively:

$$\Delta I_{0m} = I_{0m} - I_{0(m-12)} \quad (22)$$

$$\Delta V_{0m} = V_{0m} - V_{0(m-12)} \quad (23)$$

Figure 12:
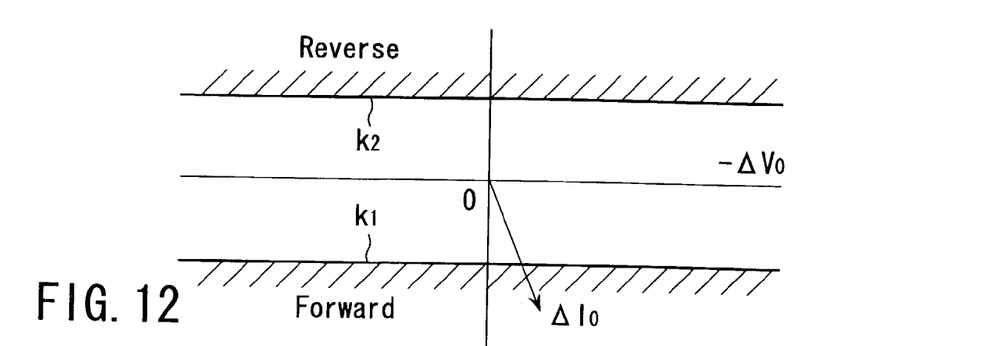
FIG. 12 is a diagram showing a determination operating range of the digital directional relay according to the fourth embodiment of the present invention.

Since the other computing units of the fourth embodiment are identical with those of the first embodiment shown in FIG. 2 except that an amount of electricity of zero-phase-sequence components is used in place of that of electricity of negative-phase-sequence components, their descriptions are omitted. The determination operating range of the fourth embodiment is shown in FIG. 12.

The digital directional relay according to the fourth embodiment is unsusceptible to an amount of electricity of zero-phase-sequence components that exist at all times using an amount of electricity of zero-phase-sequence variation. As compared with the use of zero-phase-sequence components, the direction of a fault can be determined with higher precision. The digital directional relay according to the fourth embodiment is suitable for a power system in which an influence of a fault easily appears on a zero phase rather than a negative phase. As another advantage of the fourth embodiment, there is no delay in performing a computation for zero-phase-sequence components; thus, the digital directional relay is unsusceptible to variations in frequency.

(Fifth Embodiment)

Figure 13:
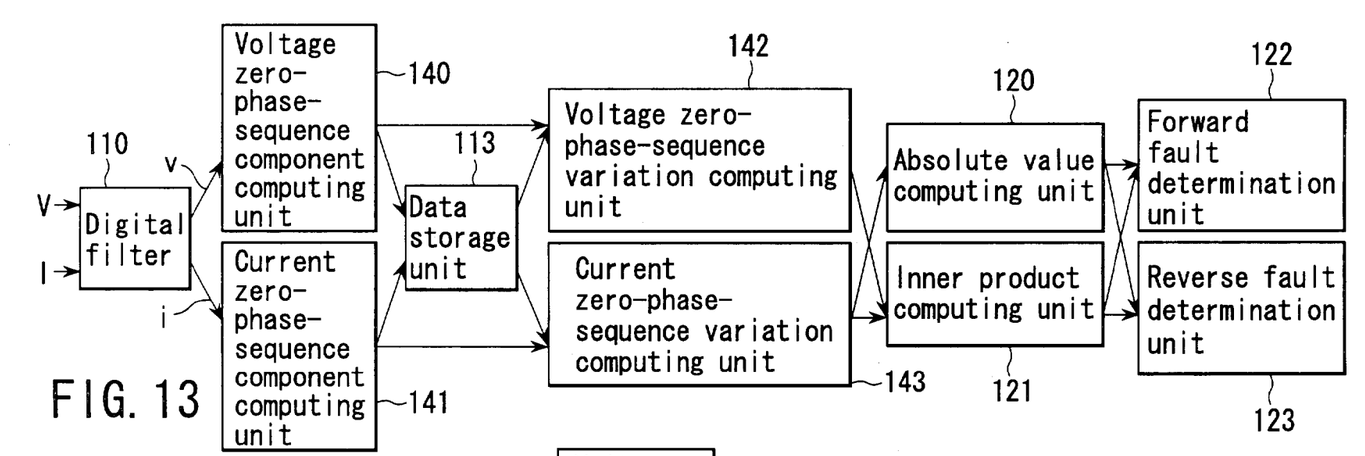
FIG. 13 is a block diagram of a computing circuit of a digital directional relay according to a fifth embodiment of the present invention.

FIG. 13 is a block diagram of respective computing units of a digital directional relay according to a fifth embodiment of the present invention.

The fifth embodiment is identical with the second embodiment shown in FIG. 6 except that an amount of electricity of zero-phase-sequence components is used in place of that of electricity of negative-phase-sequence components. The descriptions of the same operations as those of the second embodiment are therefore omitted.

The voltage zero-phase-sequence component computing unit 140, current zero-phase-sequence component computing unit 141, voltage zero-phase-sequence variation computing unit 142, and current zero-phase-sequence variation computing unit 143 are the same as those in the fourth embodiment.

Figure 14:
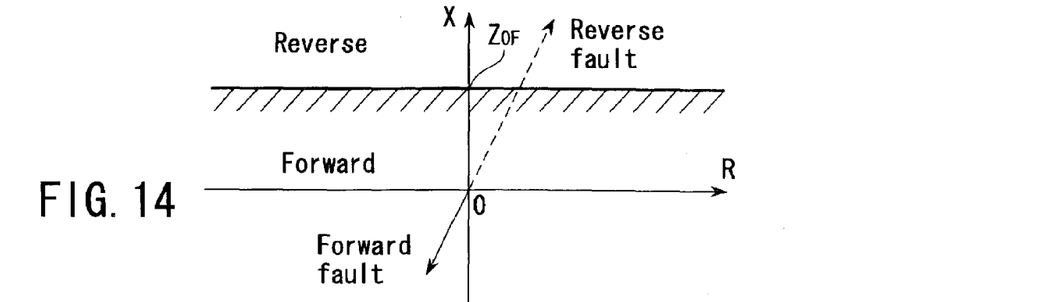
FIG. 14 is a diagram showing a determination operating range of the digital directional relay according to the fifth embodiment of the present invention.

FIG. 14 is a diagram showing a determination operating range of the digital directional relay according to the fifth embodiment.

The digital directional relay according to the fifth embodiment is unsusceptible to an amount of electricity of zero-phase-sequence components that exist at all times using an amount of electricity of unbalanced components corresponding to a zero-phase-sequence variation. Further, the digital directional relay can increase the precision with which the direction of a fault is determined. The digital directional relay according to the fifth embodiment is suitable for a power system in which an influence of a fault easily appears on a zero phase rather than a negative phase. As another advantage of the fifth embodiment, there is no delay in performing a computation for zero-phase-sequence components; thus, the digital directional relay is unsusceptible to variations in frequency.

(Sixth Embodiment)

Figure 15:
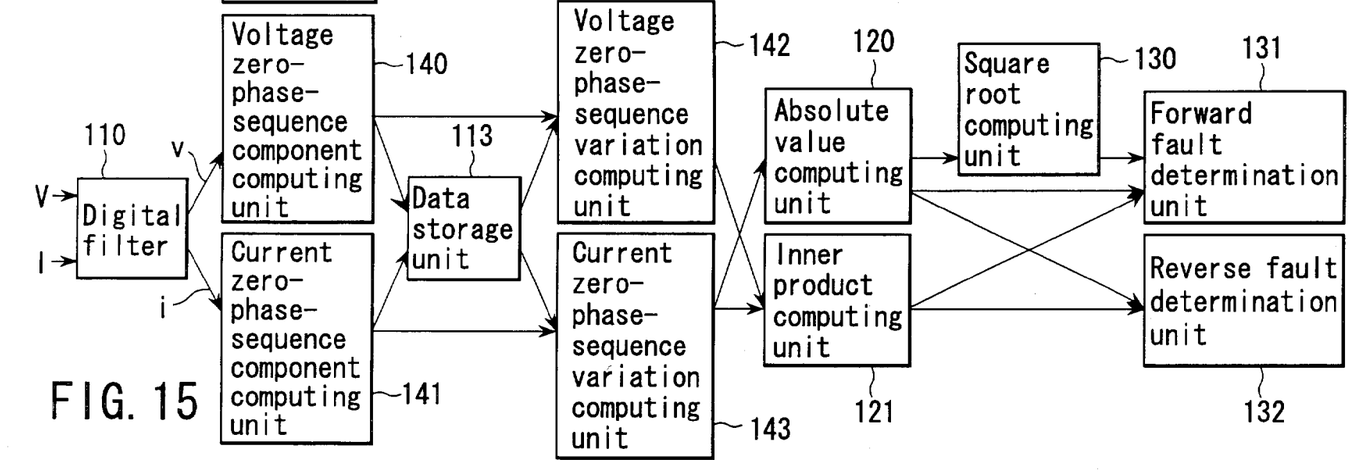
FIG. 15 is a block diagram of a computing circuit of a digital directional relay according to a sixth embodiment of the present invention.

FIG. 15 is a block diagram of respective computing units of a digital directional relay according to a sixth embodiment of the present invention.

The sixth embodiment is identical with the third embodiment shown in FIG. 8 except that an amount of electricity of zero-phase-sequence components is used in place of that of electricity of negative-phase-sequence components. The descriptions of the same operations as those of the third embodiment are therefore omitted.

The voltage zero-phase-sequence component computing unit 140, current zero-phase-sequence component computing unit 141, voltage zero-phase-sequence variation computing unit 142, and current zero-phase-sequence variation computing unit 143 are the same as those in the fourth embodiment.

Figure 16:
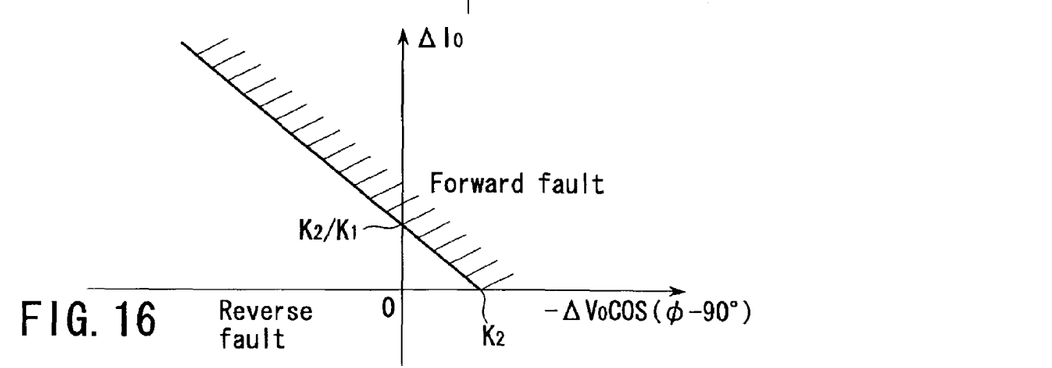
FIG. 16 is a diagram showing a determination operating range of the digital directional relay according to the sixth embodiment of the present invention.

FIG. 16 is a diagram showing a determination operating range of the digital directional relay according to the sixth embodiment.

Figure 17:
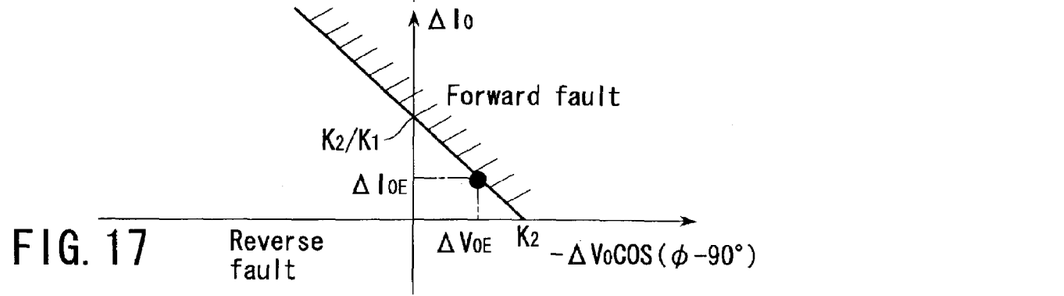
FIG. 17 is a diagram showing an example of setting of the determination operating range of the digital directional relay according to the sixth embodiment of the present invention.

The digital directional relay according to the sixth embodiment is unsusceptible to an amount of electricity of zero-phase-sequence components that exist at all times using an amount of electricity of unbalanced components corresponding to a zero-phase-sequence variation. As is seen from the graph shown in FIG. 16, particularly, the determination method according to the sixth embodiment has a feature that it can correct an error since determination sensitivity is set for each of $\Delta V_0$ and $\Delta I_0$. If a determination operating range is set as shown in FIG. 17 when the maximum values of errors can be assumed to be $\Delta V_{0E}$ and $\Delta I_{0E}$, a mal-operation due to the error can be prevented from occurring. The digital directional relay according to the sixth embodiment is suitable for a power system in which an influence of a fault easily appears on a zero phase rather than a negative phase. As another advantage of the sixth embodiment, there is no delay in performing a computation for zero-phase-sequence components; thus, the digital directional relay is unsusceptible to variations in frequency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

This application is based upon and claims the benefit of priority from the prior Japanese Patent Application No. 2002-017848, filed Jan. 28, 2002, the entire contents of which are incorporated herein by reference.

What is claimed is:

1. A digital directional relay which converts a voltage value and a current value of a power system into digital voltage data and digital current data by periodic sampling and determines a direction of a fault using the digital voltage data and the digital current data, the digital directional relay comprising:

a voltage variation computing unit which computes a variation $\Delta V_u$ in unbalanced component voltage using both voltage data at a reference point in time and voltage data at a point in time elapsed from the reference point in time by a given sampling interval;

a current variation computing unit which computes a variation $\Delta I_u$ in unbalanced component current using both current data at reference time and current data at time elapsed from the reference time by a given sampling interval;

a forward fault determination unit which determines that a forward fault occurs when a following expression is satisfied: $K_1 \Delta I_u - \Delta V_u \cos(\phi - \Psi) \geq K_2$ where $K_1$ and $K_2$ are constants and $\Psi$ is a phase difference between current and voltage; and a reverse fault determination unit which determines that a reverse fault occurs when a following expression is satisfied: $K_1 \Delta I_u - V_u \cos(\phi - \Psi) < K_2$ where $K_1$ and $K_2$ are constants and $\Psi$ is a phase difference between current and voltage.

2. A digital directional relay which converts a voltage value and a current value of a power system into digital voltage data and digital current data by periodic sampling and determines a direction of a fault using the digital voltage data and the digital current data, the digital directional relay comprising:

a voltage variation computing unit which computes a variation in unbalanced component voltage using both voltage data at a reference point in time and voltage data at a point in time elapsed from the reference point in time by a given sampling interval, said variation in unbalanced component voltage including a voltage negative-phase-sequence variation;

a current variation computing unit which computes a variation in unbalanced component current using both current data at reference time and current data at time elapsed from the reference time by a given sampling interval, said variation in unbalanced component current including a current negative-phase-sequence variation; and a fault determination unit which determines whether a forward fault or a reverse fault occurs based on a phase difference between the voltage negative-phase-sequence variation and the current negative-phase-sequence variation.

3. A digital directional relay which converts a voltage value and a current value of a power system into digital voltage data and digital current data by periodic sampling and determines a direction of a fault using the digital voltage data and the digital current data, the digital directional relay comprising:

a voltage variation computing unit which computes a variation in unbalanced component voltage using both voltage data at a reference point in time and voltage data at a point in time elapsed from the reference point in time by a given sampling interval, said variation in unbalanced component voltage including a voltage zero-phase-sequence variation;

a current variation computing unit which computes a variation in unbalanced component current using both current data at reference time and current data at time elapsed from the reference time by a given sampling interval, said variation in unbalanced component current including a current zero-phase-sequence variation; and a fault determination unit which determines whether a forward fault or a reverse fault occurs based on a phase difference between the voltage zero-phase-sequence variation and the current zero-phase-sequence variation.

4. The digital directional relay according to claim 1, wherein the variation in unbalanced component voltage is a voltage negative-phase-sequence variation and the variation in unbalanced component current is a current negative-phase-sequence variation.

5. The digital directional relay according to claim 1, wherein the variation in unbalanced component voltage is a voltage zero-phase-sequence variation and the variation in unbalanced component current is a current zero-phase-sequence variation.

* * * * *